United States Patent
Lee

(10) Patent No.: US 9,663,030 B2
(45) Date of Patent: May 30, 2017

(54) VEHICLE-INTERLOCKED TERMINAL LIGHTING CONTROL SYSTEM AND METHOD

(71) Applicant: HYUNDAI MOTOR COMPANY, Seoul (KR)

(72) Inventor: Kyung Ro Lee, Seosan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 141 days.

(21) Appl. No.: 14/540,909

(22) Filed: Nov. 13, 2014

(65) Prior Publication Data

US 2015/0165967 A1 Jun. 18, 2015

(30) Foreign Application Priority Data

Dec. 13, 2013 (KR) .................. 10-2013-0155581

(51) Int. Cl.
*B60Q 3/04* (2006.01)
*G09G 3/34* (2006.01)

(52) U.S. Cl.
CPC ........... *B60Q 3/048* (2013.01); *G09G 3/3406* (2013.01); *G09G 2320/0653* (2013.01); *G09G 2360/144* (2013.01); *G09G 2380/10* (2013.01)

(58) Field of Classification Search
CPC .............................. G09G 3/3406; B60Q 3/048
See application file for complete search history.

(56) References Cited

U.S. PATENT DOCUMENTS 5,381,074 A * 1/1995 Rudzewicz ............ B60Q 3/001
307/10.8

FOREIGN PATENT DOCUMENTS

| JP | 2005-306336 A | 11/2005 |
|---|---|---|
| JP | 2010-163114 A | 7/2010 |
| JP | 2012-059242 A | 3/2012 |
| KR | 10-2004-0073458 A | 8/2004 |
| KR | 10-2009-0013139 A | 2/2009 |
| KR | 10-2011-0093433 A | 8/2011 |
| KR | 10-1103231 B1 | 1/2012 |
| KR | 10-2012-0051810 A | 5/2012 |
| KR | 10-1189570 B1 | 10/2012 |

OTHER PUBLICATIONS

Korean Notice of Allowance dated Oct. 23, 2015, issued in corresponding Korean Application No. 10-2013-0155581.

* cited by examiner

*Primary Examiner* — Douglas W Owens
*Assistant Examiner* — Jonathan G Cooper
(74) *Attorney, Agent, or Firm* — McDermott Will & Emery LLP

(57) ABSTRACT

A vehicle-interlocked terminal lighting control system includes an integrated lighting control interlocking setting unit configured to determine whether to perform integrated lighting control between vehicle interior lighting and terminal lighting. A lighting setting initialization unit is configured to generate an illuminance mapping table defining a mapping relationship between vehicle illuminance level information and terminal illuminance level information. A lighting controller is configured to perform the integrated lighting control using an illuminance value of the vehicle interior lighting and the illuminance mapping table.

9 Claims, 6 Drawing Sheets

VEHICLE-INTERLOCKED TERMINAL LIGHTING CONTROL SYSTEM AND METHOD

CROSS-REFERENCE TO RELATED APPLICATION

This application claims the benefit of priority to Korean Patent Application No. 10-2013-0155581, filed on Dec. 13, 2013, which is hereby incorporated by reference as if fully set forth herein.

TECHNICAL FIELD

The present disclosure relates to a vehicle-interlocked terminal lighting control system and method.

BACKGROUND

A vehicle cluster overall decides lighting brightness of a vehicle based on day/night lighting brightness sensed by an illuminance sensor mounted at an outside of the vehicle and decides user-set lighting brightness to integrally control lighting of an audio video navigation (AVN)/audio device, a cluster display unit, a central air conditioner, and other vehicle switches.

When a terminal is used in the vehicle as a vehicle information provision device, lighting between the terminal and the vehicle may be inconsistent. If the inconsistency in lighting between the terminal and devices in the vehicle occurs, driver's visibility may be lowered.

SUMMARY

The present disclosure is directed a vehicle-interlocked terminal lighting control system and method that substantially obviate one or more problems due to limitations and disadvantages of the related art.

An aspect of the present disclosure provides a vehicle-interlocked terminal lighting control system and method that are capable of integrally controlling vehicle interior lighting and terminal lighting, thereby improving driver's visibility and convenience.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an exemplary embodiment of the present disclosure, a vehicle-interlocked terminal lighting control system includes an integrated lighting control interlocking setting unit configured to determine whether to perform integrated lighting control between vehicle interior lighting and terminal lighting. A lighting setting initialization unit is configured to generate an illuminance mapping table defining a mapping relationship between vehicle illuminance level information and terminal illuminance level information. A lighting controller is configured to perform the integrated lighting control using an illuminance value of the vehicle interior lighting and the illuminance mapping table.

The integrated lighting control interlocking setting unit may determine whether the integrated lighting control can be performed based on a terminal connection state and whether lighting interlocking is requested. The integrated lighting control interlocking setting unit may further determine whether the terminal is located in the vehicle upon determining that the integrated lighting control can be performed and determine to perform the integrated lighting control upon determining that the terminal is located in the vehicle.

The integrated lighting control interlocking setting unit may determine whether the terminal is located in the vehicle based on at least one selected from among vehicle speed information, a door open signal, Bluetooth reception intensity, and whether a load is sensed by a vehicle seat sensor.

The lighting setting initialization unit may receive the terminal illuminance level information, compare a difference illuminance value between a maximum illuminance value of the received terminal illuminance level information and a maximum illuminance value of the vehicle illuminance level information with a threshold value, and generate the illuminance mapping table based on a comparison result of the difference illuminance value.

Upon determining from the comparison result that the difference illuminance value is equal to or greater than the threshold value, the lighting setting initialization unit may calculate difference illuminance values between M illuminance values of the terminal illuminance level information and an n-th illuminance value of the vehicle illuminance level information. The lighting setting initialization unit may further map an illuminance value of the terminal illuminance level information corresponding to a minimum value of the calculated difference illuminance values to the n-th illuminance value of the vehicle illuminance level information and generate the illuminance mapping table based on a mapping result of the illuminance value of the terminal illuminance level information.

Upon determining from the comparison result that the difference illuminance value is less than the threshold value, the lighting setting initialization unit may map the maximum illuminance value and a minimum illuminance value of the terminal illuminance level information to the maximum illuminance value and a minimum illuminance value of the vehicle illuminance level information, respectively. The lighting setting initialization unit may calculate difference illuminance values between M illuminance values of the terminal illuminance level information and an n-th residual illuminance value of the vehicle illuminance level information. The lighting setting initialization unit may further map an illuminance value of the terminal illuminance level information corresponding to a minimum value of the calculated difference illuminance values to the n-th residual illuminance value of the vehicle illuminance level information and generate the illuminance mapping table based on a mapping result of the illuminance value of the terminal illuminance level information.

The lighting controller may calculate an illuminance value of the vehicle interior lighting using vehicle illuminance decision information, acquire an illuminance value of the terminal lighting based on the calculated illuminance value and the illuminance mapping table, and transmit the acquired illuminance value of the terminal lighting to the terminal.

The integrated lighting control interlocking setting unit may receive battery charge amount information, compare the battery charge amount information with a charge threshold value, and determine whether to perform the integrated lighting control based on a comparison result of the battery charge amount information.

According to another exemplary embodiment of the present disclosure, a vehicle-interlocked terminal lighting control method includes receiving vehicle illuminance decision information. An illuminance value of vehicle interior lighting is calculated using the vehicle illuminance decision information. An illuminance value of terminal lighting is acquired based on the calculated illuminance value and an illuminance mapping table.

The illuminance mapping table may define a mapping relationship between vehicle illuminance level information and terminal illuminance level information.

The vehicle-interlocked terminal lighting control method may further include receiving the terminal illuminance level information, comparing a difference illuminance value between a maximum illuminance value of the received terminal illuminance level information and a maximum illuminance value of the vehicle illuminance level information with a threshold value, and generating the illuminance mapping table based on the comparison result.

The step of generating the illuminance mapping table may include calculating difference illuminance values between M illuminance values of the terminal illuminance level information and an n-th illuminance value of the vehicle illuminance level information upon determining that the difference illuminance value is equal to or greater than the threshold value. An illuminance value of the terminal illuminance level information corresponding to a minimum value of the calculated difference illuminance values is mapped to the n-th illuminance value of the vehicle illuminance level information.

The step of generating the illuminance mapping table may include mapping a maximum illuminance value and a minimum illuminance value of the terminal illuminance level information to a maximum illuminance value and a minimum illuminance value of the vehicle illuminance level information, respectively, upon determining that the difference illuminance value is less than the threshold value. Difference illuminance values between M illuminance values of the terminal illuminance level information and an n-th residual illuminance value of the vehicle illuminance level information are calculated. An illuminance value of the terminal illuminance level information corresponding to a minimum value of the calculated difference illuminance values is mapped to the n-th residual illuminance value of the vehicle illuminance level information.

The vehicle-interlocked terminal lighting control method may further include determining whether to perform integrated lighting control between the vehicle interior lighting and the terminal lighting.

The determining step may include determining whether the integrated lighting control can be performed based on a terminal connection state and whether lighting interlocking is requested. Whether the terminal is located in the vehicle is determined upon determining that the integrated lighting control can be performed.

Whether the terminal is located in the vehicle may be determined based on at least one selected from among vehicle speed information, a door open signal, Bluetooth reception intensity, and whether load is sensed by a vehicle seat sensor.

Whether to perform the integrated lighting control may be determined based on a comparison result between battery charge amount information and a charge threshold value.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE INVENTION

Reference will now be made in detail to exemplary embodiments of the present disclosure, examples of which are illustrated in the accompanying drawings. First of all, terminology used in this specification and claims must not be construed as limited to the general or dictionary meanings thereof and should be interpreted as having meanings and concepts matching the technical idea of the present invention based on the principle that an inventor is able to appropriately define the concepts of the terminologies to describe the invention in the best way possible. The embodiment disclosed herein and configurations shown in the accompanying drawings are only one exemplary embodiment and do not represent the full technical scope of the present disclosure. Therefore, it is to be understood that the present invention covers the modifications and variations of this invention provided they come within the scope of the appended claims and their equivalents when this application was filed.

Figure 1:
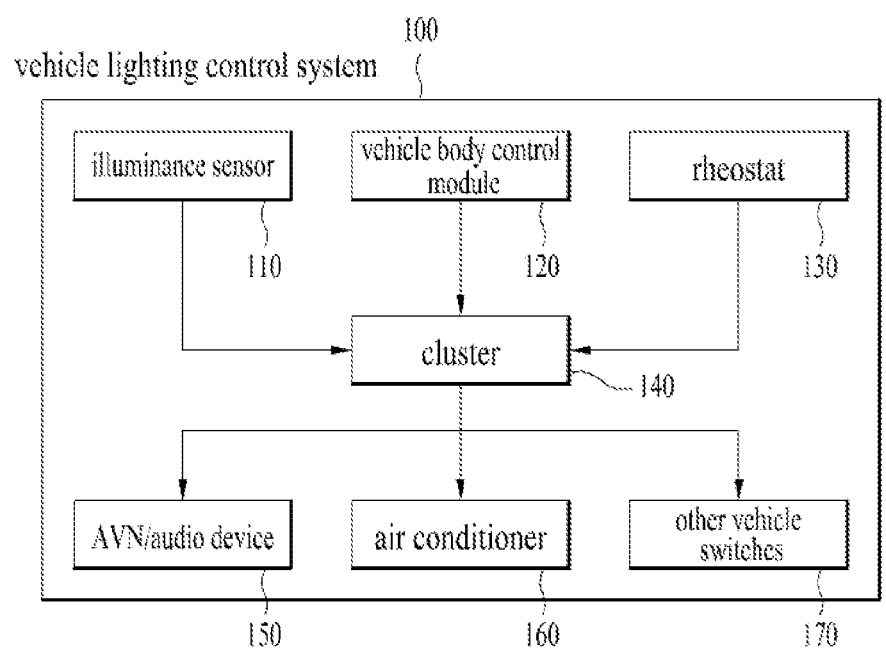
FIG. 1 is a schematic block diagram of a vehicle lighting control system according to an embodiment of the present disclosure.

FIG. 1 is a schematic block diagram of a vehicle lighting control system according to an embodiment of the present disclosure.

Referring to FIG. 1, a vehicle lighting control system 100 may include an illuminance sensor 110, a vehicle body control module 120, a rheostat 130, a cluster 140, an audio video navigation (AVN)/audio device 150, an air conditioner 160, and other vehicle switches 170.

The illuminance sensor 110 is mounted at an outside of a vehicle to measure illuminance outside the vehicle. The illuminance sensor 110 may calculate and transmit an illuminance value outside the vehicle to a cluster. The vehicle body control module 120 integrally controls an electronic control unit (ECU) of the vehicle. The vehicle body control module 120 may control of door locking and unlocking. The vehicle body control module 120 may generate and transmit a door locking or unlocking signal to the cluster. The rheostat 130 is a switch to adjust panel brightness of the cluster. The rheostat 130 may send lighting brightness information set by a user to the cluster.

The cluster 140 may receive at least one selected from among the illuminance value outside the vehicle of the illuminance sensor 110, the door locking/unlocking signal of the vehicle body control module 120, and the user-set lighting brightness information of the rheostat 130 and calculate a lighting control value based thereupon. The AVN/audio device 150, the air conditioner 160, and other vehicle switches 170, which require lighting control in the vehicle, may control brightness of corresponding lighting using the calculated lighting control value. In addition, a user terminal may be interlocked with the vehicle lighting control system 100 to control brightness of terminal lighting, which will be described in detail with reference to the accompanying drawings.

Figure 2:
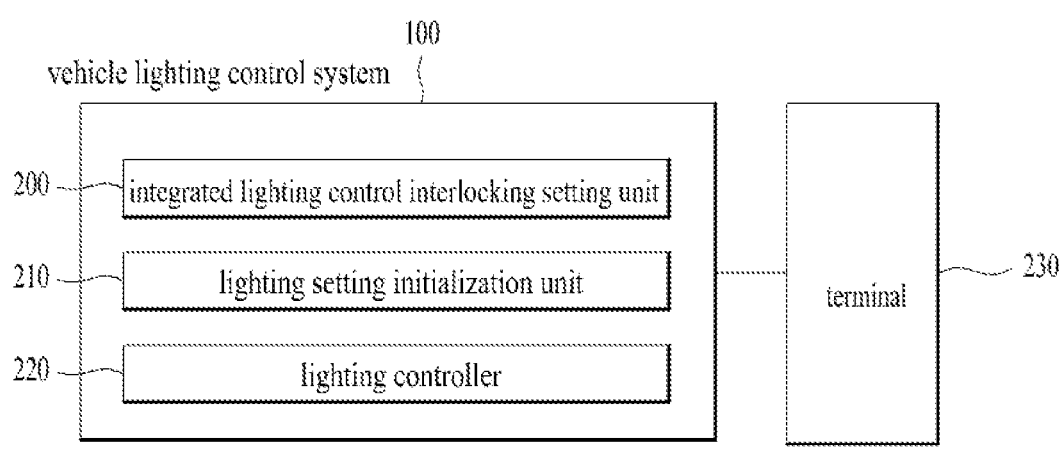
FIG. 2 is a schematic block diagram of a vehicle lighting control system to control terminal lighting according to an embodiment of the present disclosure.

FIG. 2 is a schematic block diagram of a vehicle lighting control system to control terminal lighting according to an embodiment of the present disclosure.

The vehicle lighting control system 100 may include an integrated lighting control interlocking setting unit 200, a lighting setting initialization unit 210, and a lighting controller 220.

The vehicle lighting control system 100 may be connected to a user terminal 230 through wired/wireless communication and control illuminance of terminal lighting based on set illuminance of vehicle interior lighting. Specifically, the terminal 230 may be connected to the AVN/audio device 150 of the vehicle lighting control system 100. In this case, illuminance of the terminal lighting may be controlled based on illuminance of AVN/audio lighting. However, the present disclosure is not limited thereto. The terminal 230 may be connected to the cluster 140, the air conditioner 160, or other vehicle switches 170 of the vehicle lighting control system 100.

The integrated lighting control interlocking setting unit 200 determines whether to perform integrated lighting control between the vehicle interior lighting and the terminal lighting. Integrated lighting control may control illuminance of the terminal lighting according to illuminance of the vehicle interior lighting through interlocking between the terminal and the vehicle lighting control system. The integrated lighting control interlocking setting unit 200 may determine whether to perform integrated lighting control considering a terminal connection state, whether lighting interlocking has been requested, and whether the terminal is located in the vehicle, which will be described in detail with reference to FIG. 3.

The lighting setting initialization unit 210 performs synchronization of illuminance between the vehicle interior lighting and the terminal lighting. That is, the lighting setting initialization unit 210 may generate and store an illuminance mapping table defining illuminance of the vehicle interior lighting and illuminance of the terminal lighting mapped therewith. A method of generating the illuminance mapping table will be described with reference to FIG. 4.

The lighting controller 220 performs integrated lighting control using an illuminance value of the vehicle interior lighting decided based on the lighting control value of the cluster 140 and the illuminance mapping table generated by the lighting setting initialization unit 210. In addition, the lighting controller 220 may perform integrated lighting control considering a battery charge amount of the terminal connected to the vehicle lighting control system 100. A method of performing integrated lighting control will be described in detail with reference to FIGS. 5 and 6.

Figure 3:
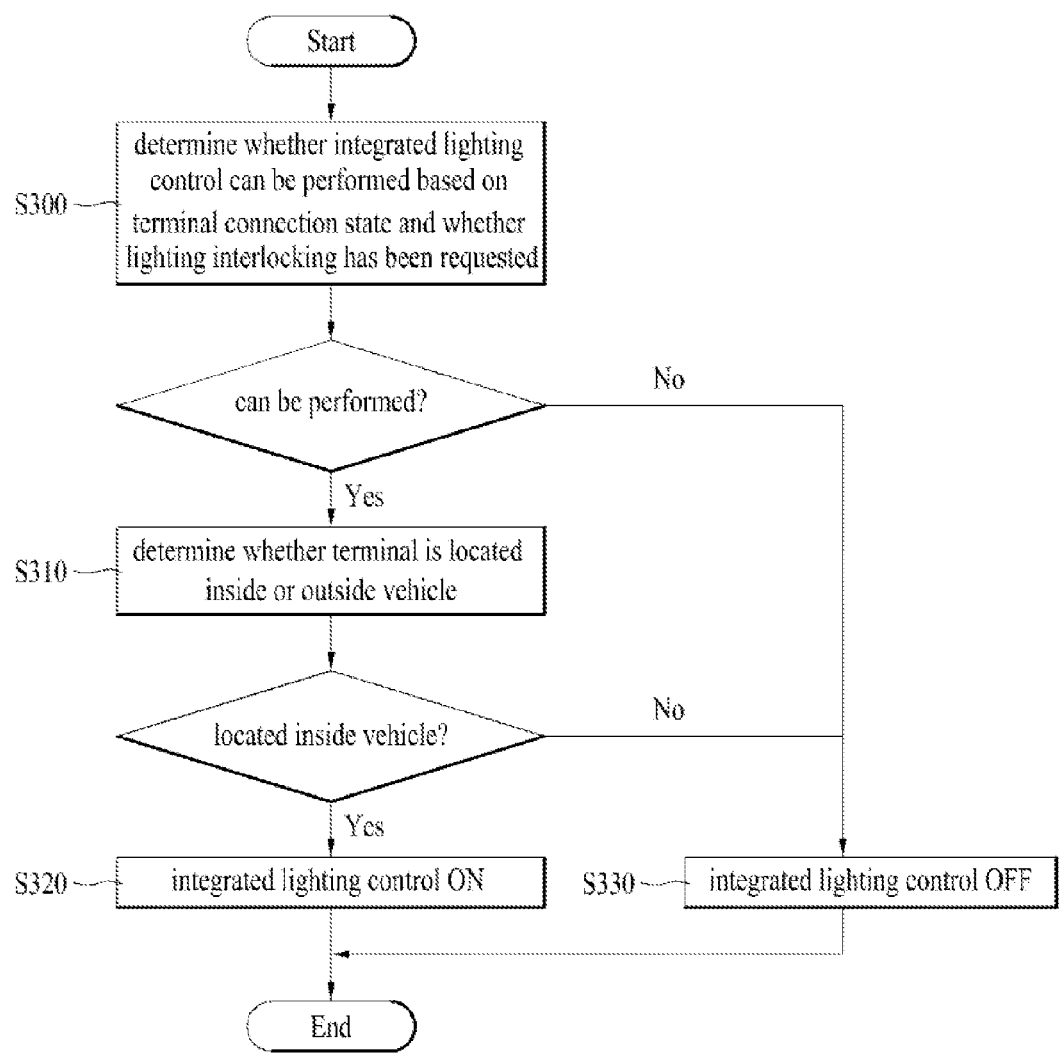
FIG. 3 is a flowchart showing a method of determining, by an integrated lighting control interlocking setting unit, whether to perform integrated lighting control according to an embodiment of the present disclosure.

FIG. 3 is a flowchart showing a method of determining, by the integrated lighting control interlocking setting unit, whether to perform integrated lighting control according to an embodiment of the present disclosure.

It is determined whether integrated lighting control can be performed based on a terminal connection state and whether lighting interlocking has been requested (S300). The terminal connection state may a wired/wireless connection state between the vehicle lighting control system 100 and the terminal 230. Whether lighting interlocking has been requested may be determined based on whether a lighting interlocking request signal has been received from the terminal 230. That is, when the vehicle lighting control system 100 and the terminal 230 are connected to each other and the vehicle lighting control system 100 receives a lighting interlocking request signal from the terminal 230, the integrated lighting control interlocking setting unit 200 may determine that integrated lighting control can be performed.

Upon determining that integrated lighting control can be performed, the integrated lighting control interlocking setting unit 200 may determine whether the terminal 230 is located inside or outside the vehicle (S310).

Specifically, whether the terminal 230 is located inside or outside the vehicle may be determined based on the following embodiments:

1) Vehicle Speed Information

Location of the terminal 230 may be determined based on vehicle speed information. For example, when a vehicle speed based on the vehicle speed information is greater than 0 km, the vehicle is in a driving state. In this case, it may be determined that the terminal 230 is located inside the vehicle. However, when a vehicle speed based on the vehicle speed information is 0 km, it cannot be determined whether the terminal 230 is located inside or outside the vehicle. In this case, the following embodiment may be combined to determine whether the terminal 230 is located inside or outside the vehicle.

2) Door Open Signal

Location of the terminal 230 may also be determined based on a door open signal. For example, when a door open signal is sensed through the vehicle body control module, it may mean that a user has gotten off the vehicle. In this case, the terminal 230 may be moved from inside the vehicle to outside the vehicle along with the user. In any cases, it is not necessary to perform integrated lighting control since the user is not presented in the vehicle although the terminal 230 is inside the vehicle. When the door open signal is sensed, therefore, it may be determined that the terminal 230 is located outside the vehicle.

3) Bluetooth Reception Intensity

When the vehicle lighting control system 100 and the terminal 230 are connected to each other through near field wireless communication, such as Bluetooth, location of the terminal 230 may also be determined based on Bluetooth reception intensity. For example, when the Bluetooth reception intensity from the terminal 230 is equal to or less than a predetermined threshold value $threshold_{BT}$, the vehicle lighting control system 100 may determine that the terminal 230 is located outside the vehicle. On the other hand, when Bluetooth reception intensity from the terminal 230 exceeds the threshold value $threshold_{BT}$, the vehicle lighting control system 100 may determine that the terminal 230 is located inside the vehicle.

4) Vehicle Seat Sensor

Location of the terminal 230 may also be determined based on whether load has been sensed by a vehicle seat sensor. That is, when a load sensing signal is received from the vehicle seat sensor, it may be determined that the terminal 230 is located inside the vehicle. On the other hand, when no load sensing signal is received from the vehicle seat sensor, it may be determined that the terminal 230 is located outside the vehicle.

The above embodiments are individually used. However, at least two of the embodiments may be combined to synthetically determine the location of the terminal.

Upon determining at step S310 that the terminal 230 is located inside the vehicle, integrated lighting control between the vehicle lighting control system 100 and the terminal 230 can be performed (S320).

On the other hand, upon determining at step S300 that integrated lighting control cannot be performed or upon determining at step S310 that the terminal 230 is located outside the vehicle, integrated lighting control between the vehicle lighting control system 100 and the terminal 230 may not be performed (S330).

Figure 4:
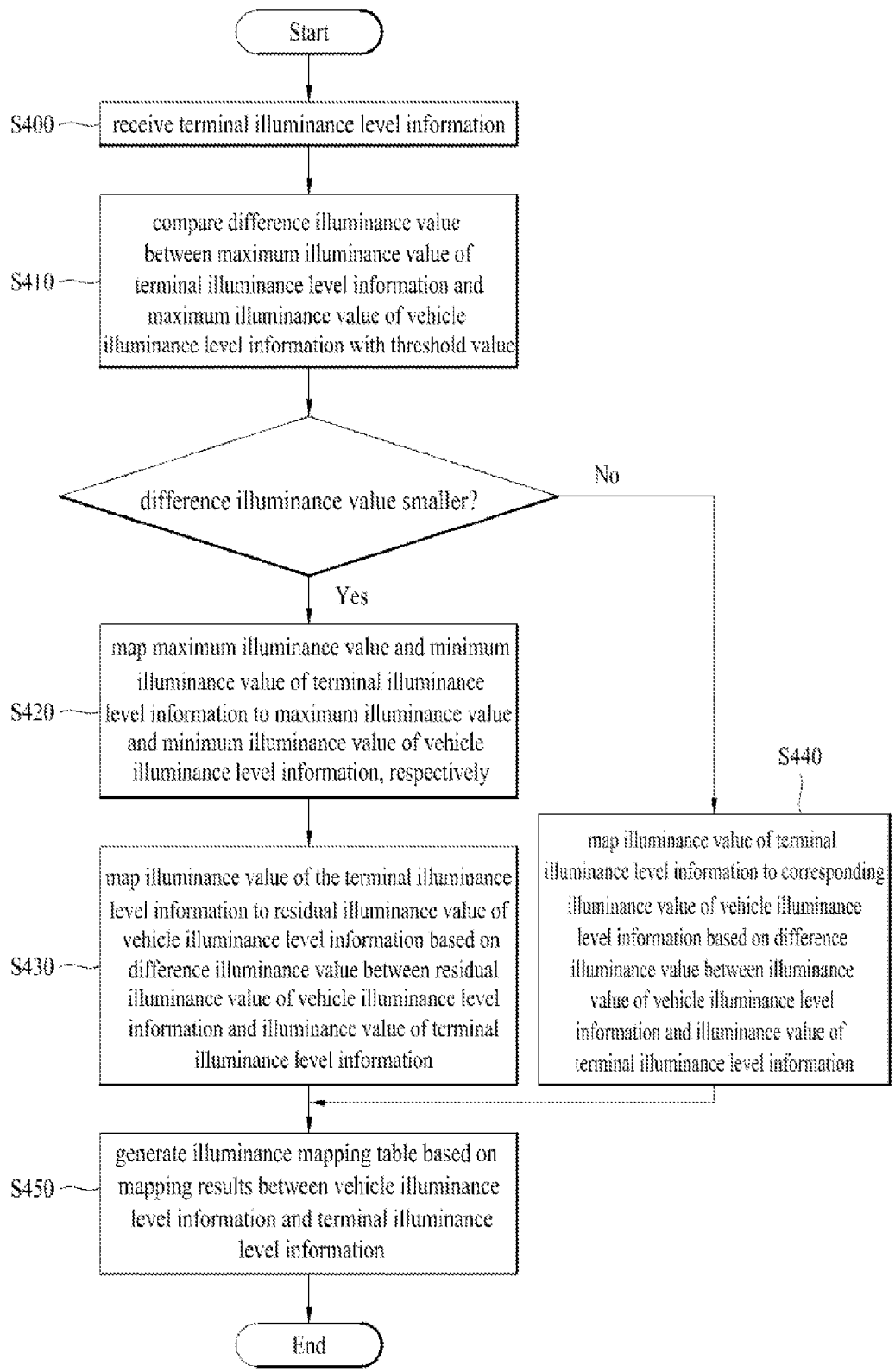
FIG. 4 is a flowchart showing a method of generating, by a lighting setting initialization unit, an illuminance mapping table according to an embodiment of the present disclosure.

FIG. 4 is a flowchart showing a method of generating an illuminance mapping table by a lighting setting initialization unit according to an embodiment of the present disclosure.

An illuminance level and range supported by a vehicle may be different from those supported by the terminal. For this reason, it is necessary to uniformly match illuminance for the vehicle and illuminance for the terminal with each other for integrated lighting control between the vehicle and the terminal. The lighting setting initialization unit 210 may set illuminance level information of the terminal lighting (hereinafter, referred to as terminal illuminance level information) corresponding to illuminance level information of the vehicle interior lighting (hereinafter, referred to as vehicle illuminance level information) to generate an illuminance mapping table for integrated lighting control.

The terminal illuminance level information may include at least one selected from between information regarding the number of illuminance levels supported by the terminal and an illuminance value corresponding to each illuminance level. That is, the terminal illuminance level information may include N illuminance values corresponding to illuminance levels supported by the terminal. Similarly, the vehicle illuminance level information may include at least one selected from between information regarding the number of illuminance levels supported by the vehicle and an illuminance value corresponding to each illuminance level. That is, the vehicle illuminance level information may include M illuminance values corresponding to illuminance levels supported by the vehicle. N and M are natural numbers greater than 1.

Referring to FIG. 4, terminal illuminance level information may be received from the terminal 230 (S400).

A difference illuminance value between the maximum illuminance value of the received terminal illuminance level information and the maximum illuminance value of vehicle illuminance level information may be compared with a predetermined threshold value (S410). The difference illuminance value is defined as a difference between the maximum illuminance value of the terminal illuminance level information and the maximum illuminance value of the vehicle illuminance level information. However, the present disclosure is not limited thereto. For example, a difference illuminance value between the minimum illuminance value of the received terminal illuminance level information and the minimum illuminance value of the vehicle illuminance level information may be used.

Upon determining at step S410 that the difference illuminance value is less than the predetermined threshold value, the illuminance level and range supported by the vehicle may be similar to those supported by the terminal. Therefore, the maximum illuminance value and the minimum illuminance value of the received terminal illuminance level information may be mapped to the maximum illuminance value and the minimum illuminance value of the vehicle illuminance level information, respectively (S420).

Subsequently, an illuminance value of the terminal illuminance level information may be mapped to a residual illuminance value of the vehicle illuminance level information based on a difference illuminance value between the residual illuminance value of the vehicle illuminance level information and the illuminance value of the terminal illuminance level information (S430). The residual illuminance value may be an illuminance value of the vehicle illuminance level information excluding the maximum illuminance value and the minimum illuminance value.

Specifically, difference illuminance values between M illuminance values of the terminal illuminance level information and an n-th ($1 \leq n \leq N-2$) residual illuminance value of the vehicle illuminance level information may be calculated. The illuminance value of the terminal illuminance level information corresponding to the minimum value of the calculated M difference illuminance values may be mapped to the n-th residual illuminance value of the vehicle illuminance level information. As mapping is performed based on the difference illuminance value therebetween as described above, it is possible to uniform illuminance difference therebetween and to use the illuminance level supported by the terminal at a full range.

On the other hand, upon determining at step S410 that the difference illuminance value is equal to or greater than the predetermined threshold value, it may mean that the illuminance level and range supported by the vehicle are not similar to those supported by the terminal. In this case, synchronization of illuminance therebetween may not be achieved when the maximum illuminance values and the minimum illuminance values therebetween are mapped to each other at step S420.

Upon determining at step S410 that the difference illuminance value is equal to or greater than the predetermined threshold value, therefore, the illuminance value of the terminal illuminance level information may be mapped to the corresponding illuminance value of the vehicle illuminance level information based on the difference illuminance value between the illuminance value of the vehicle illuminance level information and the illuminance value of the terminal illuminance level information (S440).

Specifically, difference illuminance values between M illuminance values of the terminal illuminance level information and an n-th ($1 \leq n \leq N$) illuminance value of the vehicle illuminance level information may be calculated. The illuminance value of the terminal illuminance level information corresponding to the minimum value of the calculated M difference illuminance values may be mapped to the n-th illuminance value of the vehicle illuminance level information. As the illuminance value of the terminal illuminance level information and the illuminance value of the vehicle illuminance level information minimizing the difference illuminance value are mapped to each other as described above, it is possible to perform mapping between illuminance levels within a similar range and to maximize efficiency of integrated lighting control.

An illuminance mapping table may be generated based on the mapping results between the vehicle illuminance level information and the terminal illuminance level information (S450). The illuminance mapping table may be generated per terminal. In addition, the illuminance mapping table may be stored in the vehicle lighting control system 100 and reused when lighting interlocking is requested from the same terminal.

Figure 5:
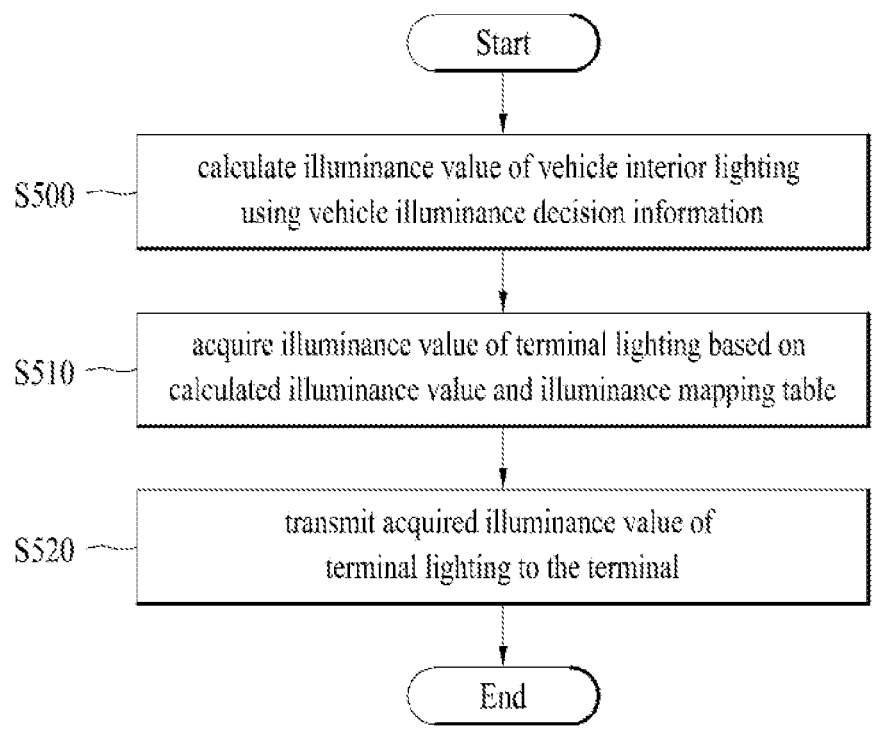
FIG. 5 is a flowchart showing a method of performing, by a lighting controller, integrated lighting control according to an embodiment of the present disclosure.

FIG. 5 is a flowchart showing a method of performing integrated lighting control by a lighting controller according to an embodiment of the present disclosure.

Referring to FIG. 5, an illuminance value of the vehicle interior lighting may be calculated using vehicle illuminance decision information (S500). The vehicle illuminance decision information may include at least one selected from among an illuminance value outside the vehicle, a door locking/unlocking signal, and user-set lighting brightness information.

An illuminance value of the terminal lighting may be acquired based on the illuminance value calculated at step S500 and the illuminance mapping table (S510). That is, an illuminance value of the terminal lighting mapped to the illuminance value of the vehicle interior lighting may be acquired from the illuminance mapping table. The method of generating the illuminance mapping table was previously described with reference to FIG. 4, and therefore, a detailed description thereof will be omitted.

The illuminance value of the terminal lighting acquired at step S510 may be transmitted to the terminal 230 (S520). The terminal 230 may perform lighting control using the received illuminance value.

Figure 6:
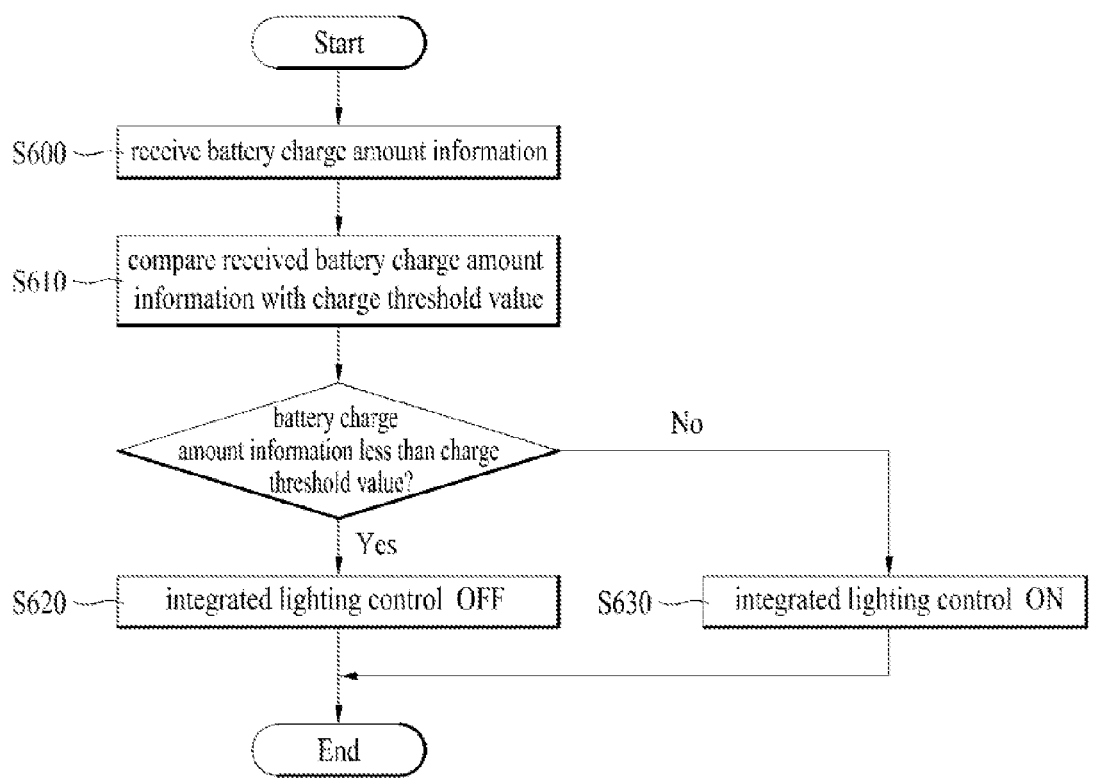
FIG. 6 is a flowchart showing a method of performing, by the vehicle lighting control system, integrated lighting control considering a battery charge amount according to an embodiment of the present disclosure.

FIG. 6 is a flowchart showing a method of performing integrated lighting control considering a battery charge amount by a vehicle lighting control system according to an embodiment of the present disclosure.

Referring to FIG. 6, battery charge amount information may be received from the terminal 230 (S600). The battery charge amount information may be received when the vehicle lighting control system 100 requests transmission of the battery charge amount information from the terminal 230. For example, transmission of the battery charge amount information may be requested at time intervals set in the vehicle lighting control system 100. Alternatively, transmission of the battery charge amount information may be requested when the vehicle lighting control system 100 senses a power saving mode signal generated by the terminal 230.

Upon receiving the battery charge amount information at step S600, the received battery charge amount information may be compared with a charge threshold value (S610). The charge threshold value may be a critical value of the battery charge amount of the terminal for integrated lighting control. The charge threshold value may be preset by the vehicle lighting control system 100 or set and stored by a user.

Upon determining at step S610 that the battery charge amount information is less than the charge threshold value, execution of integrated lighting control may be terminated (S620). In addition, at least one selected from between an integrated lighting control execution termination message or a terminal charging notification message may be generated and transmitted to the AVN/audio device 150 or the terminal 230.

On the other hand, upon determining at step S610 that the battery charge amount information is equal to or greater than the charge threshold value, execution of integrated lighting control may continue (S630).

As is apparent from the above description, the terminal is interlocked with the vehicle lighting control system 100 to integrally control lighting therebetween, thereby solving inconsistency in lighting between the terminal and the vehicle, and thus improving driver's visibility. In addition, when the terminal is used as a vehicle information provision device, a navigation system, or a TV, it is possible to reduce driver's eye strain.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A vehicle-interlocked terminal lighting control system comprising:
   an integrated lighting control interlocking setting unit configured to determine whether to perform integrated lighting control between vehicle interior lighting and terminal lighting;
   a lighting setting initialization unit configured to generate an illuminance mapping table defining a mapping relationship between vehicle illuminance level information and terminal illuminance level information; and
   a lighting controller configured to perform the integrated lighting control using an illuminance value of the vehicle interior lighting and the illuminance mapping table,
   wherein the integrated lighting control interlocking setting unit is further configured to: determine whether the integrated lighting control can be performed based on a terminal connection state and whether lighting interlocking is requested; determine whether the terminal is located in the vehicle upon determining that the integrated lighting control can be performed; and determine to perform the integrated lighting control upon determining that the terminal is located in the vehicle.

2. The vehicle-interlocked terminal lighting control system according to claim 1, wherein the integrated lighting control interlocking setting unit is configured to determine whether the terminal is located in the vehicle based on at least one selected from among vehicle speed information, a door open signal, Bluetooth reception intensity, and whether a load is sensed by a vehicle seat sensor.

3. The vehicle-interlocked terminal lighting control system according to claim 1, wherein the lighting setting initialization unit is configured to
   receive the terminal illuminance level information,
   compare a difference illuminance value between a maximum illuminance value of the received terminal illuminance level information and a maximum illuminance value of the vehicle illuminance level information with a threshold value, and
   generate the illuminance mapping table based on a comparison result of the difference illuminance value.

4. The vehicle-interlocked terminal lighting control system according to claim 3, wherein the lighting setting initialization unit is configured to
   calculate difference illuminance values between M illuminance values of the terminal illuminance level information and an n-th illuminance value of the vehicle illuminance level information upon determining from the comparison result that the difference illuminance value is equal to or greater than the threshold value, map an illuminance value of the terminal illuminance level information corresponding to a minimum value of the calculated difference illuminance values to the n-th illuminance value of the vehicle illuminance level information, and generate the illuminance mapping table based on a mapping result of the terminal illuminance level information.

5. The vehicle-interlocked terminal lighting control system according to claim 3, wherein the lighting setting initialization unit is configured to map the maximum illuminance value and a minimum illuminance value of the terminal illuminance level information to the maximum illuminance value and a minimum illuminance value of the vehicle illuminance level information, respectively, upon determining from the comparison result that the difference illuminance value is less than the threshold value;

calculate difference illuminance values between M illuminance values of the terminal illuminance level information and an n-th residual illuminance value of the vehicle illuminance level information, map an illuminance value of the terminal illuminance level information corresponding to a minimum value of the calculated difference illuminance values to the n-th residual illuminance value of the vehicle illuminance level information, and generate the illuminance mapping table based on a mapping result of the illuminance value.

6. The vehicle-interlocked terminal lighting control system according to claim 1, wherein the lighting controller is configured to calculate the illuminance value of the vehicle interior lighting using vehicle illuminance decision information, acquire an illuminance value of the terminal lighting based on the calculated illuminance value and the illuminance mapping table, and transmit the acquired illuminance value of the terminal lighting to the terminal.

7. The vehicle-interlocked terminal lighting control system according to claim 1, wherein the integrated lighting control interlocking setting unit is configured to receive battery charge amount information, compare the battery charge amount information with a charge threshold value, and determine whether to perform the integrated lighting control based on a comparison result of the battery charge amount information.

8. The vehicle-interlocked terminal lighting control system according to claim 1, further comprising:

an illuminance sensor configured to measure illuminance outside a vehicle and send an illuminance value outside the vehicle to a cluster;

a vehicle body control module configured to integrally control an electronic control unit (ECU) and to control door locking and unlocking; and a rheostat configured to adjust panel brightness of the cluster, wherein the cluster receives at least one selected from among the illuminance value outside the vehicle of the illuminance sensor, a door locking/unlocking signal of the vehicle body control module, and user-set lighting brightness information of the rheostat and calculates a lighting control value.

9. The vehicle-interlocked terminal lighting control system according to claim 8, further comprising an audio video navigation (AVN)/audio device, an air conditioner, and other vehicle switches for controlling brightness of corresponding lighting using the calculated lighting control value.

* * * * *